June 7, 1960     R. S. CONDON     2,939,498
SAW MACHINE FOR FORMING OVAL, BOWL SHAPED ARTICLES
Filed Sept. 5, 1957     3 Sheets-Sheet 1

INVENTOR.
ROBERT S. CONDON
BY
Richard von N. Brunn
Attorney

June 7, 1960     R. S. CONDON     2,939,498
SAW MACHINE FOR FORMING OVAL, BOWL SHAPED ARTICLES
Filed Sept. 5, 1957     3 Sheets-Sheet 2

June 7, 1960  R. S. CONDON  2,939,498
SAW MACHINE FOR FORMING OVAL, BOWL SHAPED ARTICLES
Filed Sept. 5, 1957  3 Sheets-Sheet 3

United States Patent Office 2,939,498
Patented June 7, 1960

2,939,498

SAW MACHINE FOR FORMING OVAL, BOWL SHAPED ARTICLES

Robert S. Condon, Berlin, Conn., assignor to Adirondack Bowls, Inc., Old Forge, N.Y., a corporation of New York Filed Sept. 5, 1957, Ser. No. 682,133

3 Claims. (Cl. 144—33)

This invention relates generally to forming machinery, and has particular reference to a specialized forming machine which employs a novel arrangement of cutting blades to form an ovel bowl shaped article in a single operation.

Essentially, the present invention provides for the movement of a work piece through an arcuate path into successive cutting engagement with arcuate portions of a frusto-conical cutter and an annular saw blade lying in planes radial to the work piece path. The cutter and saw blade are of unequal diameter so that two concentric cuts or kerfs are made in the work piece during a single pass thereof through its arcuate path, these cuts being arcuate in both the transverse and longitudinal directions of the work piece due to the relative movement of the parts. However, since the arcuate path of the work piece has a larger radius than that of either the cutter or the saw blade, the concentric cuts will have larger radii in the longitudinal direction than in the transverse direction so that the article formed will be in the shape of a segment of a torus, or, of an oval bowl.

The present invention is related to that disclosed in co-pending application Ser. No. 644,540, filed March 7, 1957, by the applicant herein, issued February 17, 1959, as Patent No. 2,873,774, which application is also directed toward a machine capable of forming an oval, bowl shaped article in a single operation. In the saw machine of the co-pending application, however, a different blade arrangement is used which arrangement is well suited for relatively large bowl shaped articles but is not entirely satisfactory for smaller articles of the same shape. The invention disclosed herein, on the other hand, is particularly adapted for forming small bowl shaped articles but would not be very practical in forming those of a larger size.

As in the case of the applicant's earlier invention, one of the principal uses contemplated for the present invention is in the manufacture of oval bowls of wood for serving salad. These bowls are usually sold in sets, each set including a relatively large serving bowl and six or more smaller bowls for individual portions. The present invention is particularly directed toward the formation of the latter which, as pointed out hereinabove, cannot easily be made by the same machine which forms the large serving bowls.

As mentioned in the applicant's earlier application, the manufacture of round wooden bowls has never presented any particular problem in the past and the machines for forming these bowls embody principles well known in the art. However, the manufacture of an oval bowl has always been considerably more difficult because of its irregular shape. Thus, several different steps are usually required in order to form the rough bowl, and thereafter the bowl must be finished by hand because it has not been possible to follow the oval shape with conventional finishing equipment such as planers and the like. This, of course, greatly increases the time and labor needed to produce an oval bowl and results in a much higher cost. With the present invention, on the other hand, the bowl can be rough formed in a single operation and, since the arcuate contours of the rough bowl are true arcs of a circle in both the longitudinal and transverse directions, the bowl can also be finished by machines making use of this true geometrical shape.

Accordingly, with the foregoing and other considerations in view, it may be stated that the broad object of the present invention is to provide a saw machine which is capable of making two concentric cuts in a work piece in a single operation.

Another equally important object of the invention is to provide a saw machine which is capable of rough forming an oval, bowl shaped article in a single operation.

Still another important object of the invention is to provide a saw machine capable of forming an oval, bowl shaped article wherein the arcuate contours of the article are true arcs of a circle in both the longitudinal and transverse direction so that the finishing of the article by machine methods is greatly facilitated.

A further important object of the invention is to provide a saw machine for forming an oval, bowl shaped article, or an article in the form of a segment of a torus, which machine is relatively simple in construction and operation.

A more specific object of the invention is to provide a saw machine for forming an oval, bowl shaped article wherein the cutting is effected by radially disposed cutting members or blades of unequal diameter, the member with the smaller diameter being arranged for first engagement with the work piece whereby the inner cut is completed first while the article being formed is still connected to the work piece.

Other objects and advantages of the invention will become apparent from the following detailed description thereof read in conjunction with the accompanying drawings which illustrate a representative embodiment of the invention for the purposes of disclosure.

Figures 1, 5:
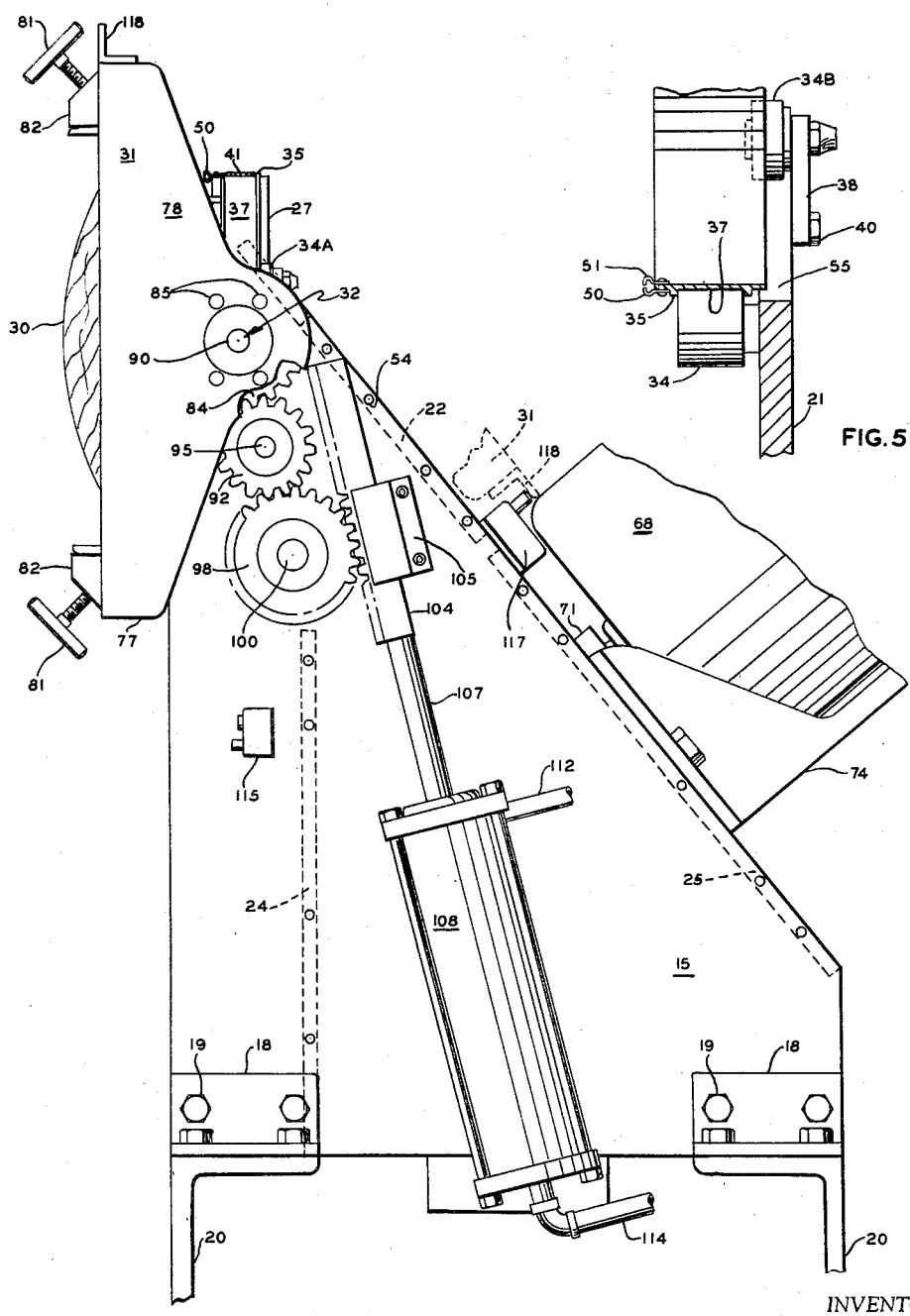
Figure 1 is a side elevation of the left side of a forming machine embodying the invention, the work piece carriage of the machine being shown in its starting position.
Figure 5 (Sheet 1) is a detailed side elevation, partly in section, of the roller mounting means for the annular saw blade of the machine.

Having reference now to the drawings, wherein like reference numbers designate the same part in each of the views, the machine is provided with a supporting frame comprised of a pair of spaced, parallel side members or plates 15, 16 which are connected together by a number of transversely extending plates to be described presently. The bottoms of the side members, adjacent the front and back edges thereof, are secured as by angle irons 18 and bolts 19 to channel members 20 which are shown fragmentarily in Figures 1 and 3 and are adapted to rest upon the workshop floor and be secured thereto by any suitable means.

The transversely extending plates of the supporting frame, Figure 3, include a pair of blade supporting plates 21, 22 adjacent the upper part of the frame and a pair of motor supporting plates 24, 25 positioned below the blade supporting plates. The blades comprise a vertically disposed annular ring 27 having saw teeth thereon and an angularly offset frusto-conical cutter 28 which is partially positioned within the annular ring. Both the annular saw blade and the frusto-conical cutter are rotatably mounted and are located so that they project into the arcuate path travelled by a work piece 30 carried by a carriage 31 which is pivotally secured to the side members 15, 16 at 32, Figures 1 and 2. The blade supporting plates 21, 22 are arranged so that the central plane of the ring 27 and base plane of the conical cutter 28 diverge substantially radially from the pivotal axis of the carriage through the points 32—32 or, stated another way, these planes are substantially normal to a tangent to the work piece path at the point of intersection of the blades therewith.

Figure 2:
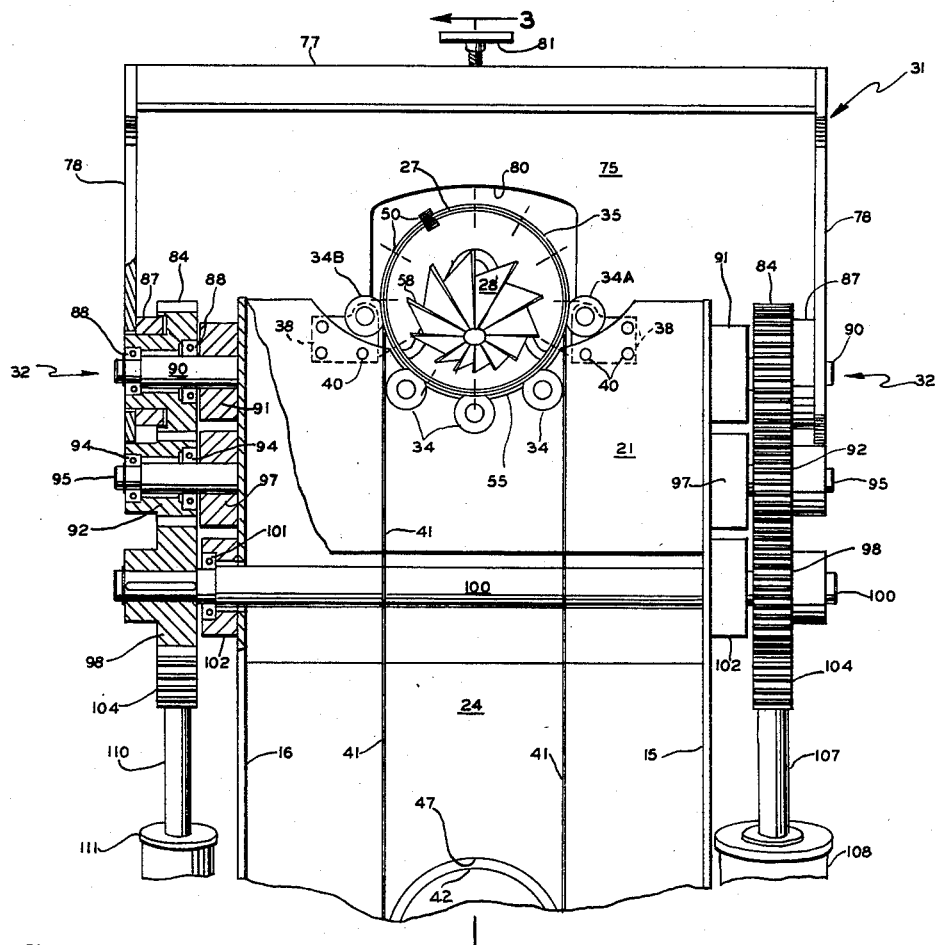
Figure 2 is a back elevation of the machine shown in Figure 1 with the carriage in its stop position.

The annular blade 27 is supported by a plurality of rollers 34 which are secured to and extend substantially horizontally outwardly from the plate 21. As best shown in Figure 2, five such rollers are employed and these are arranged so that they engage the lower portion of the blade only, thus leaving the upper portion thereof unsupported and free for cutting engagement with the work piece. The rollers 34 are preferably mounted on bearings in a manner similar to that disclosed for the rollers in the applicant's co-pending application Ser. No. 644,540, supra, and reference is made to said application for a detailed description of the roller construction.

Figures 3, 4:
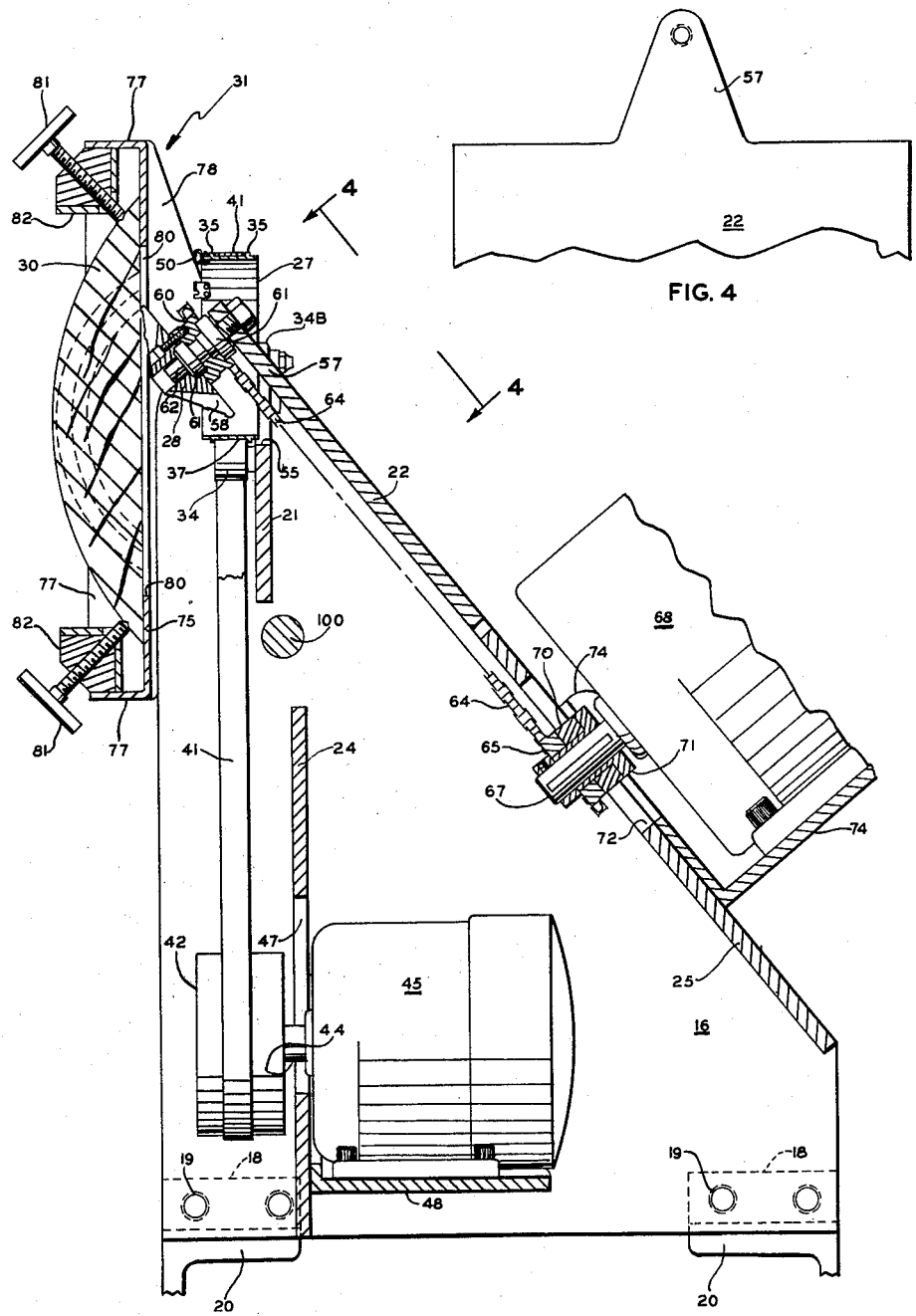
Figure 3 is a vertical section through the machine taken substantially along line 3—3 of Figure 2, the carriage being shown, however, in its starting position as in Figure 1.
Figure 4 is a fragmentary plan view of the conical cutter mounting plate looking in the direction indicated by line 4—4 of Figure 3.

In order to maintain the annular blade 27 in engagement with the rollers 34, the rim of the blade is formed with a pair of spaced circumferential ribs 35, Figures 3 and 5, which define a shallow channel 37 therebetween. The three lowermost rollers are received with a free fit in this channel as indicated, while the upper two rollers 34a, 34b serve as thrust rollers or bearings and abut against the outside of the front rib which is on the side of the blade opposite the cutting edge side. To this end, each of the rollers 34a, 34b is mounted on a separate plate 38 which is secured to the front of the plate 21 by bolts 40 as is best shown in Figure 5.

The annular ring or blade 27 is driven to effect cutting engagement with the work piece by means of a thin, flexible band or belt 41 which is positioned in the channel at the upper portion of the ring and extends downwardly to a motor pulley 42 located adjacent the bottom of the machine directly below the ring. The pulley 42 is fixed on the shaft 44 of an electric motor 45, Figure 3, the shaft passing through an elongated opening 47 in the motor supporting plate 24. The motor itself is mounted on an L-shaped bracket 48 which is adjustably secured to the plate 24 so that the motor can be raised or lowered to adjust the tension on the drive band 41. The band thus exerts a downward force on the ring 27 and maintains it in engagement with the three lowermost rollers 34.

The cutting means for annular ring 27 comprises a plurality of saw teeth 50, and preferably these are supported on the ring by securing them to the leading or rear edge thereof as by riveting or welding. In the embodiment shown, there are eight teeth arranged in groups of two with the groups being alternately secured to the inside and outside of the ring edge. Alternate teeth have oppositely offset cutting edges 51 as is best shown in the modification of Figure 6 so that the kerf formed in the work piece will be sufficiently wide to accommodate the thickness of the ring and allow the work piece to pass freely therebeyond.

Figure 6:
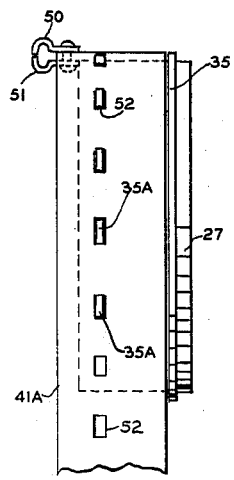
Figure 6 (Sheet 2) is an enlarged fragmentary section through the annular ring showing another possible method of supporting the saw teeth thereon.

As an alternative to attaching the teeth 50 directly on the ring 27 as above described, the teeth can also be supported thereon by securing them to the drive band 41 as shown in Figure 6. In such case, a wider band 41a is employed so that the portion of the band to which the teeth are attached will extend beyond the rear or leading edge of the ring when the opposite band edge abuts against the front rib 35. To this end, the rear rib 35 of the ring is ground away at regularly spaced intervals and the band 41 is formed with apertures 52 corresponding with the remaining rib section 35a so that a chain and sprocket engagement is effected therebetween.

The supporting plate 22 for the frusto-conical cutter 28 is obliquely disposed with respect to the plate 21 and is secured between the side plates 15, 16 by means of bolts 54 as indicated in Figures 1 and 3 to form the upper portion of the front wall of the machine. The vertical plate 21 is cut away adjacent the annular ring 27 as at 55, Figures 2 and 3, so that it does not block off any part of the opening through the ring, and plate 22 is formed at its upper edge with a centrally disposed tapered tongue or projection 57 which extends obliquely into the ring opening as is best shown in Figures 3 and 4. The cutter 28 is rotatably secured to the end of the tongue 57 on the lower side thereof and, due to the angular disposition of the mounting plate, the lower portion of the cutter is positioned within the annular ring while the upper portion projects outwardly therefrom into the arcuate path travelled by the work piece 30.

The diameter of the frusto-conical cutter at its base is smaller than the inner diameter of the annular ring 27, and since the carriage movement is in the clockwise direction from its starting position shown in Figures 1 and 3, it will be seen that the cutter blades 58 engage the work piece before the cutting means on the ring and form the inner surface of the oval bowl shaped article. As previously mentioned, the plane of the base of the cutter and the central plane of the annular saw blade are radially disposed with respect to the carriage pivot axis so that concentric cuts will be formed in the work piece, and the relative position of the two blades and angle of the mounting plate 22 are carefully determined to effect this result.

The cutter 22 is secured as by bolts to a sprocket 60, Figure 3, and the two parts are mounted as a unit on bearings 61 supported by a pin 62 threaded into the plate 22. The sprocket 60 is driven by a chain 64 which is in turn driven by a sprocket 65 on the shaft 67 of an electric motor 68. The motor sprocket 65 is loose on the motor shaft except for a shear pin 70 which connects it with a collar 71 fixed on the shaft. The motor shaft and collar 71 extend through an elongated opening 72 in the motor supporting plate 25, the motor itself being mounted on an L-shaped bracket 74 which is adjustably secured to the upper side of the plate so that the motor can be raised or lowered to adjust the tension on the chain.

Figures 7, 8:
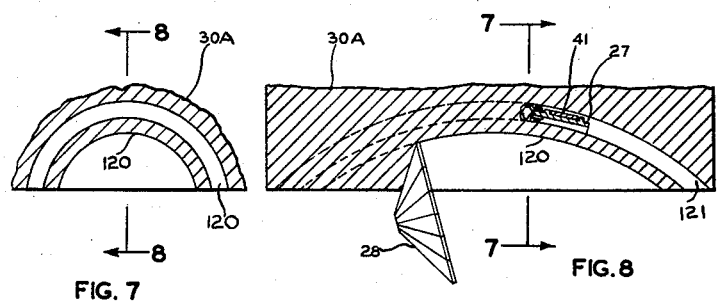
Figure 7 is a vertical transverse section through a wood block work piece taken substantially along line 7—7 of Figure 8.
Figure 8 is a vertical longitudinal section through the work piece taken substantially along line 8—8 of Figure 7.

The work piece supporting carriage 31, Figures 1 and 3, is a shallow box-like structure having a substantially rectangular base plate 75 and four side walls 77 projecting outwardly from the edges of the plate. Secured to the vertically disposed pair of side walls 77 are a pair of inwardly extending side arms 78 which straddle the frame side members 15, 16 as best shown in Figure 2 and are pivotally secured thereto in a manner to be presently described. The base plate 75 is formed with a centrally disposed cut away area indicated at 80 in Figures 2 and 3, and the work piece 30 is mounted in overlying relation to this opening which permits engagement with the cutter 28 and annular saw blade 27 therewith. The work piece, in the manufacture of an oval bowl by means of the subject machine, may be one of the solid semiellipsoidal waste pieces produced by the machine disclosed in the applicant's co-pending application Ser. No. 644,540, as shown in Figures 1 and 3, or it may be a solid semi-cylindrical block 30a as shown in Figures 7 and 8, the work piece in either case being detachably secured to the carriage by a pair of enlarged set screws 81 supported by brackets 82 secured to opposite side walls 77 of the carriage.

As is best shown in Figures 1 and 2, each of the carriage side arms 78 is secured at its inner end to a gear 84 as by bolts 85 which pass through an intermediate collar 87 mounted on the hub of the gear. The gears are supported by means of bearings 88 on a pair of stub shafts 90 secured in the bosses 91 at oppositely disposed points on the outer sides of the frame members 15, 16. The gears 84 mesh with pinions 92 which are supported by bearings 94 on the stub shafts 95, the latter being secured in bosses 97 mounted on the members 15, 16. The pinions 92 also mesh with another pair of gears 98 secured to the opposite ends of a transversely extending idler shaft 100 which is journalled in bearings 101 supported by bosses 102 mounted on the frame side members below the bosses 97.

The pinions 92 and gears 98 are offset forwardly with respect to the gears 84, see Figure 1, and the forward side of each gear 98 meshes with a rack 104, the upper end of which is held in engagement with the gear by a guide bracket or channel 105 secured to the boss 102. The lower end of the rack 104 at the left side of the machine is secured to the upwardly extending piston rod 107 of an air cylinder 108 mounted on the frame side member 15. The rack 104 at the right side of the machine is secured to the upstanding piston rod 110 of a hydraulic rate control mechanism 111 mounted on the frame side member 16. The rate control mechanism 111 is a commercially available item and is not claimed per se as a part of the present invention, the mechanism being manufactured and sold by the Bellows Falls Co. under the name "hydro-check." This mechanism is designed to meter fluid for a constant rate of drive.

The air cylinder 108 is provided with the usual air hose connections 112, 114 which connect the cylinder with a suitable source of compressed air. When air is admitted to the cylinder through the upper connection 112, the piston rod 107 and rack 104 connected therewith are moved downwardly causing the left hand gear 98 to rotate in the clockwise direction as viewed in Figure 1. The rotation of the left hand gear 98 is transmitted through the idler shaft 100 to the right hand gear 98, and together the gears drive the pinions 92 counterclockwise and the upper gears 84 clockwise causing the carriage to move clockwise through an arcuate path from its starting position adjacent the rear of the machine to a stop position adjacent the front of the frame.

While the left hand rack 104 is being driven downwardly by the air cylinder, the right hand rack is being moved in the same direction by its gear 98. However, the downward movement of the right hand rack is controlled or snubbed by the hydraulic mechanism 111 so that the drive through the gears and pinions is constant. This arrangement is employed because it is desirable to have a compressed air drive which is in excess of the power actually needed in order to obtain good control, and the hydro-check insures that this drive will be smooth and at a uniform rate throughout the work stroke. In actual practice, the feeding rate is relatively slow while the return stroke is rapid, the latter being limited only by the setting of the exhaust control of the air cylinder.

In effecting the drive during the work stroke, the idler shaft 100 absorbs the heavy torsion stresses and accordingly is made of a suitable size to withstand such stresses. This relieves the work piece carriage of the major portion of these stresses, and therefore minimizes the possibility of twisting the carriage structure. In addition, while the carriage drive could operate through the rack, gears and pinion on the air cylinder side of the machine frame only, the provision of a drive train on both sides of the frame, with the power being transmitted through the idler shaft 100, further insures a uniform drive and minimum stresses for the carriage.

The motors 45 and 68 for the annular saw blade and cutter, respectively, are simultaneously put into operation by a single start-stop switch 115 mounted on the frame side member 15. In addition, the carriage actuates a microswitch 117 at the end of its work stroke which shuts off both motors. To this end, switch 117 is mounted on the motor supporting plate 25 and is engaged by a small angle member 118 mounted on the carriage when the latter reaches its stop position indicated by phantom lines in Figure 1.

The operation of the forming machine in producing an oval wooden bowl is as follows: The work piece 30 is positioned in the carriage 31 and is secured thereto by the set screws 81. The machine is then put into operation by means of the motor switch 115 and a conventional control which opens the air supply to the air cylinder, the latter causing the carriage to move the work piece clockwise into engagement with the cutter 28 and annular saw blade 27. The slab is brought into engagement with the cutter 28 first and it starts to form a cut 120 therein, see Figures 1, 7 and 8. After the carriage has moved through an angle of approximately 40°, the slab moves into engagement with the annular blade 27 which commences to saw a kerf 121 concentric with the cut 120 formed by the cutter 28. It will be apparent from Figure 8 that at the time the annular blade engages the slab, a good portion of the inner cut 120 has already been made. Thereafter, as the carriage continues to move the inner cut is completed, but when this happens a considerable portion of the outer kerf 121 still remains to be made so that the article being formed is still firmly attached to the work piece slab and the carriage. The carriage then completes its travel until it stops adjacent the front frame plate 22, and shortly before reaching this point the outer kerf is completed allowing the oval bowl that has been formed to fall against the plate 22.

It will be understood from the foregoing that the oval bowl, or segment of a torus, that is formed will have a uniform thickness throughout, and that this thickness is determined by the difference between the inner diameter of the annular blade 27 and the base diameter of the cutter 28. Accordingly, annular blades and cutters of different sizes can also be utilized to form different sized bowls within reasonable limitations. In every case, however, the concentric cuts or kerfs formed by the machine are in the form of true arcs of a circle in both the longitudinal and transverse direction, see Figures 7 and 8, so that finishing by machine methods is greatly facilitated.

While the invention has been described with particular reference to the manufacture of oval wooden bowls, it is not intended that it be restricted to such use since the arrangement disclosed can also be advantageously employed for many other purposes. The embodiments disclosed are therefore to be considered in all respects as illustrative and not restrictive, the scope of the invention being indicated by the appended claims.

What is claimed is:

1. In a power operated forming machine, a supporting frame, a carriage adapted to move a work piece in an arcuate path about a horizontal pivot axis located in said supporting frame, air operated means to drive said carriage, hydraulic means to control the drive of said air operated means, an annular saw blade, roller means on said frame rotatably supporting a portion of said saw blade in a substantially vertical plane with an unsupported portion thereof extending into the path of the work piece for engagement with the piece, a frustoconical cutter blade rotatably mounted on said frame in angularly offset relation to said annular saw blade, a portion of said cutter blade being positioned within said annular blade and another portion thereof projecting outwardly from the annular blade into the path of the work piece for engagement with the piece, said cutter blade having a smaller over-all diameter than the inside diameter of said annular blade and being located ahead of the annular blade in the work piece path for first engagement with the piece, and a motor to rotate each of said annular and cutter blades during movement of said carriage.

2. A device as defined in claim 1 wherein said roller means for said annular saw blade project substantially horizontally from a vertical support comprising a part of said frame, said support being open opposite said blade, and an obliquely disposed support having a projecting portion extending into said annular blade opening, said frusto-conical cutter blade being rotatably secured to said projecting portion within said annular blade.

3. In a power operated forming machine, a supporting frame, a carriage adapted to move a work piece in an arcuate path about a horizontal pivot axis located in said supporting frame, an annular saw blade, roller means on said frame rotatably supporting a portion of said saw blade in a substantially vertical plane with an unsupported portion thereof extending into the path of the work piece for engagement with the piece, a frusto-conical cutter blade rotatably mounted on said frame in angularly offset relation to said annular saw blade, a portion of said cutter blade being positioned within said annular blade and another portion thereof projecting outwardly from the annular blade into the path of the work piece for engagement with the piece, said cutter blade having a smaller over-all diameter than the inside diameter of said annular blade and being located ahead of the annular blade in the work piece for first engagement with the piece, and power operated means to simultaneously move said carriage and rotate said blades.

References Cited in the file of this patent

UNITED STATES PATENTS

| 25,014 | Hay | Aug. 9, 1859 |
| 80,382 | Barber | July 28, 1868 |
| 1,935,337 | Sprague | Nov. 14, 1933 |
| 2,751,941 | Smith | June 26, 1956 |
| 2,753,899 | Murfin | July 10, 1956 |
| 2,782,814 | Smith | Feb. 26, 1957 |
| 2,809,680 | Nethery et al. | Oct. 15, 1957 |
| 2,873,774 | Condon | Feb. 17, 1959 |

UNITED STATES PATENT OFFICE
CERTIFICATE OF CORRECTION

Patent No. 2,939,498                                          June 7, 1960

Robert S. Condon

It is hereby certified that error appears in the printed specification of the above numbered patent requiring correction and that the said Letters Patent should read as corrected below.

Column 8, line 7, after "piece" insert -- path --.

Signed and sealed this 22nd day of November 1960.

(SEAL)
Attest:

KARL H. AXLINE
Attesting Officer

ROBERT C. WATSON
Commissioner of Patents